United States Patent
Hasegawa

(10) Patent No.: US 7,203,726 B2
(45) Date of Patent: Apr. 10, 2007

(54) SYSTEM AND METHOD FOR APPENDING ADVERTISEMENT TO MUSIC CARD, AND STORAGE MEDIUM STORING PROGRAM FOR REALIZING SUCH METHOD

(75) Inventor: Yutaka Hasegawa, Shizuioka-Ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 652 days.

(21) Appl. No.: 10/045,397

(22) Filed: Nov. 7, 2001

(65) Prior Publication Data

US 2002/0143631 A1 Oct. 3, 2002

(51) Int. Cl.
G06F 15/16 (2006.01)
(52) U.S. Cl. .................. 709/206; 709/203; 709/217
(58) Field of Classification Search ................ 709/206, 709/217–219, 231, 203
See application file for complete search history.

(56) References Cited

U.S. PATENT DOCUMENTS

| | | | | |
|---|---|---|---|---|
| 5,426,594 | A * | 6/1995 | Wright et al. ............... | 709/206 |
| 6,288,319 | B1 * | 9/2001 | Catona ......................... | 84/609 |
| 6,295,058 | B1 * | 9/2001 | Hsu et al. .................... | 715/769 |
| 2002/0054072 | A1 * | 5/2002 | Hayes-Roth ................ | 345/727 |
| 2002/0103697 | A1 * | 8/2002 | Lockhart et al. ............. | 705/14 |
| 2003/0061566 | A1 * | 3/2003 | Rubstein et al. ............. | 705/14 |
| 2003/0208556 | A1 * | 11/2003 | Friedman et al. ........... | 709/246 |

FOREIGN PATENT DOCUMENTS

| | | |
|---|---|---|
| DE | 19849759 | 5/2000 |
| JP | 11-203217 | 7/1999 |

OTHER PUBLICATIONS

Anonymous: "BCYellowpages.com—Birthday Cards" NN, Feb. 14, 1997.
Anonymous: "Under the Sun—Interactive Web Site", NN, Apr. 12, 1997.
European Search Report dated Dec. 28, 2005.

* cited by examiner

Primary Examiner—Philip B. Tran
(74) Attorney, Agent, or Firm—Harness, Dickey & Pierce, P.L.C.

(57) ABSTRACT

An advertisement appending apparatus comprises a storage device that stores image, music, and advertisement data for creating the music card, a receiver that receives a request from a card sender via a network, a card creating device that creates the music card by selecting data from the storage device, an advertisement appending device that appends advertisement data stored in said storage device to the music card, if either the selected image data or music data is fee-charged, and a transmitter that transmits the music card appended with the advertisement data to a card receiver via the network.

13 Claims, 7 Drawing Sheets

SYSTEM AND METHOD FOR APPENDING ADVERTISEMENT TO MUSIC CARD, AND STORAGE MEDIUM STORING PROGRAM FOR REALIZING SUCH METHOD

This application is based on Japanese Patent Application 2000-340650, filed on Nov. 8, 2000, the entire contents of which are incorporated herein by reference.

BACKGROUND OF THE INVENTION

A) Field of the Invention

The present invention relates to an advertisement appending system and more particularly to an advertisement appending system for appending an advertisement to a music card.

B) Description of the Related Art

Various services are provided free of charge on World Wide Web (WWW) servers on the Internet. One example is a service (hereinafter called a card service) of generating a Web page (home page) which displays greeting cards with music (hereinafter called a music card).

With this service, a Uniform Resource Locator (URL) of a generated Web page is written in an email which is sent to an email receiver, without appending an image or music having a large data capacity directly to the email.

The person received the email with URL clicks it or enter it in a Web browser to display a greeting music card.

In this specification, the concept of a "card" is not limited only to a sheet made of paper or the like but includes those displayed on a display and providing the same function as the sheet made of paper or the like.

This card service is provided free of charge so that music and images free from copyright royalties are used. Since popular music and images are not used, this service is not attractive to many users.

If popular music and images with copyright royalties are to be used, this service becomes a fee-charged service or cannot be run as business.

SUMMARY OF THE INVENTION

An object of the present invention is to provide a service free of charge even if a card is created using data requiring a copyright royalty or the like.

According to one aspect of the present invention, there is provided an apparatus for appending an advertisement to a music card, comprising: a storage device that stores a plurality of image data, a plurality of music data, and a plurality of advertisement data, respectively for creating the music card; a receiver that receives a request from a card sender via a network; a card creating device that creates, in accordance with the request, the music card by selecting an image data and a music data from the plurality of image data and the plurality of music data stored in said storage device; an advertisement appending device that appends at least one advertisement data among the plurality of advertisement data stored in said storage device to the music card, if either the selected image data or music data is fee-charged; and a transmitter that transmits the music card appended with the advertisement data to a card receiver via the network.

As above, a service free of charge can be provided even if a card is created using data requiring a copyright royalty or the like.

DETAILED DESCRIPTION OF THE PREFERRED EMBODIMENTS

Figure 1:
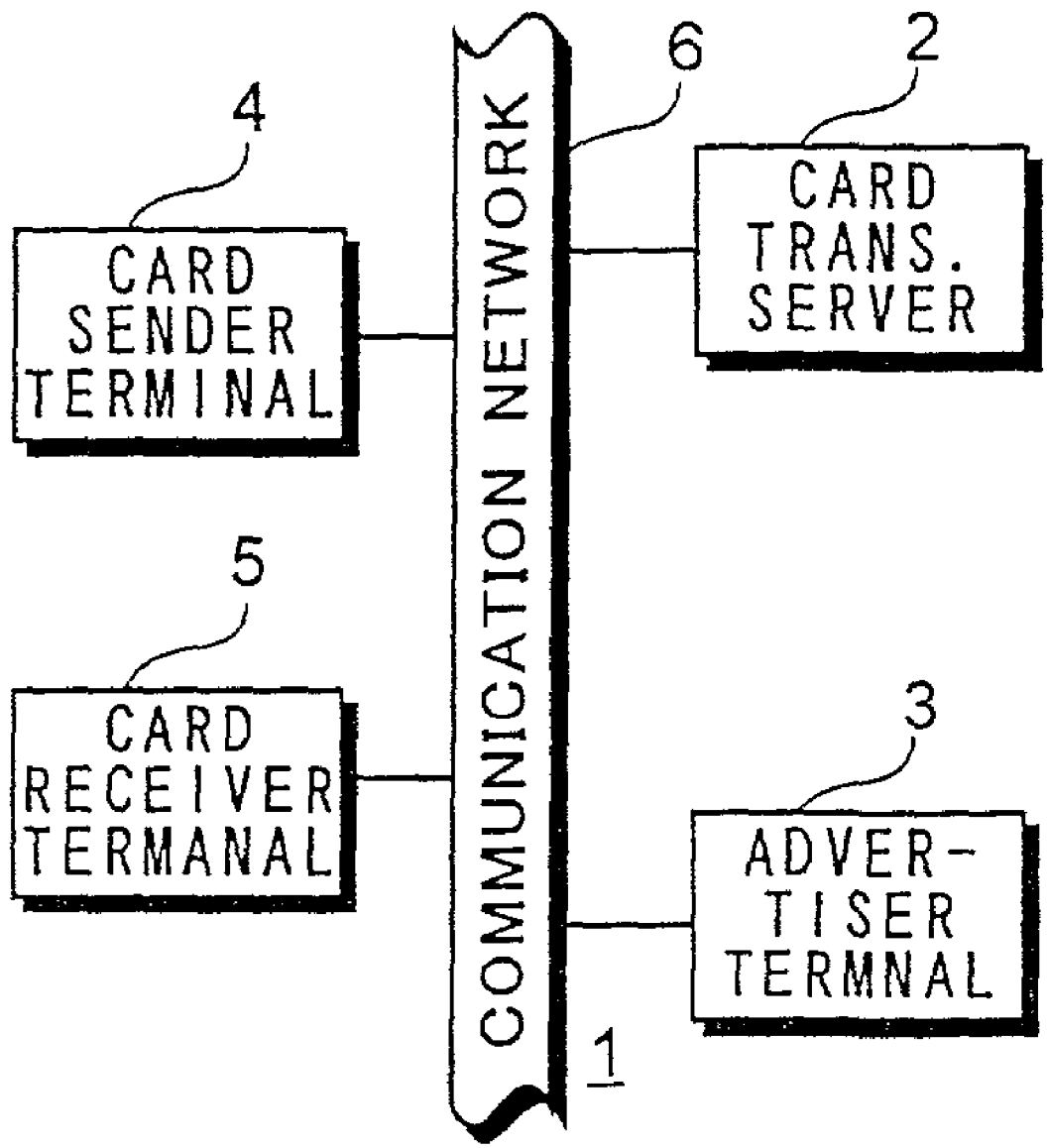
FIG. 1 is a block diagram showing an example of the structure of an advertisement appending system 1 for appending an advertisement to a music card according to an embodiment of the invention.

FIG. 1 is a block diagram showing an example of the structure of an advertisement appending system 1 for appending an advertisement to a music card according to an embodiment of the invention.

The advertisement appending system 1 for appending an advertisement to a music card (hereinafter simply called an advertisement appending system) is constituted of a card transmitter server 2, an advertiser terminal 3, a card sender terminal 4, and a card receiver terminal 5, respectively connected via a communication network 6, e.g., the Internet, a communication line or the like. The card transmitter server 2 is, for example, a World Wide Web (WWW) server on the Internet made of a computer PC shown in FIG. 2, and stores data of a number of images, music and advertisements (advertisement images) to be described later.

In response to a user request, the card transmitter server 2 provides a card service of creating a Web page for displaying a greeting card (hereinafter simply called a card) by using stored image, music and advertisement data, writing URL of the Web page in an email, and sending the email to the card receiver terminal 5.

Figure 2:
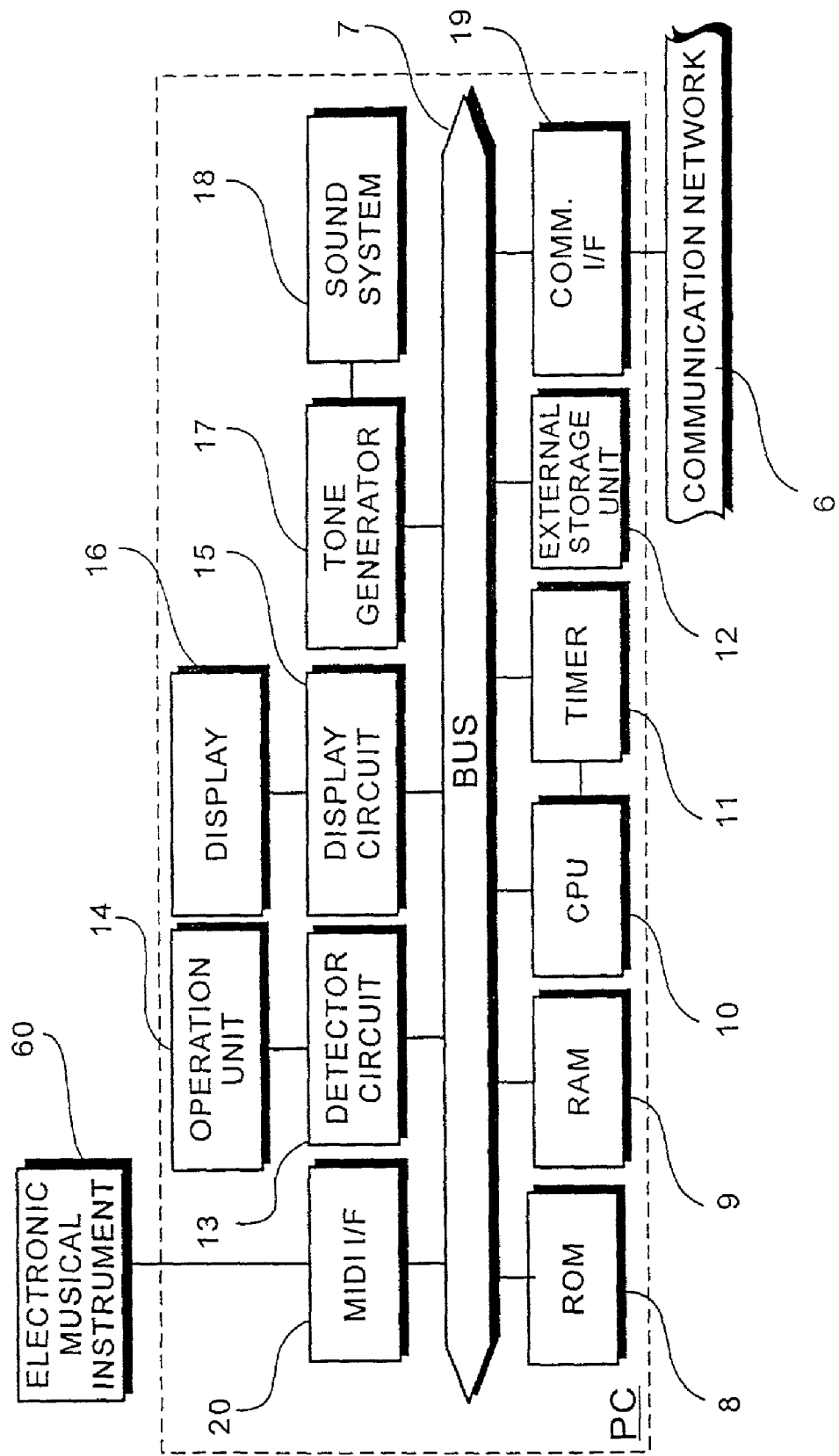
FIG. 2 is a block diagram showing the hardware structure of a computer PC.

The advertiser terminal 3 is made of, for example, the computer PC shown in FIG. 2, and is a terminal from which an advertiser requests to append an advertisement to a card. The advertiser requests to append an advertisement from this advertiser terminal 3. As will be later described with reference to FIG. 4, the advertiser registers advertisement images or the like and their links and selectively registers either image data or music data for which the advertisement is displayed. Thereafter, the advertiser registers various contract terms.

As the advertiser requests to append an advertisement, an advertiser account is formed in the card transmitter server 2. In this embodiment, a predetermined advertisement fee is charged when an advertisement is actually appended to a card. A predetermined fee may be charged when the advertiser requests to append an advertisement.

In the advertisement appending system 1 of this embodiment, although only one advertiser terminal 3 is connected, a plurality of advertiser terminals may be connected.

The card sender terminal 4 is made of, for example, the computer PC shown in FIG. 2, and is a terminal from which a card sender requests the card transmitter server 2 to transmit a card.

When a card sender connects the card sender terminal 4 to the card transmitter server 2, a card transmitter Web page is displayed on a display 16 (FIG. 2) of the card sender terminal 4. By referring to this Web page, the card sender creates a card by selecting an image to be appended to the card, inputting an email address, a message and the like, and selecting music to be appended to the card, as will be later detailed with reference to FIG. 5. Information of the created card is stored in the card transmitter server 2.

If the image or music required to pay a copyright royalty or the like (hereinafter simply called a licensing fee) is selected by the card sender, at least one of an advertisement image, advertisement music and the like requested by the advertiser is appended to the card. By appending an advertisement, the card sender can request a card transmission even if fee-charged contents are selected.

The contents used in this specification include various informations appended to a card, such as card image, music data, motion picture data or the like to be reproduced during displaying the card. There are free of charge contents and fee-charged contents.

The card receiver terminal 5 is made of, for example, the computer PC shown in FIG. 2, and is a terminal for receiving a card and displaying it.

The card receiver at the card receiver terminal 5 receives an email with URL notifying that a card was sent (hereinafter called a notice mail) transmitted from the card transmitter server 2, as will be later detailed. The card receiver terminal 5 can be connected to the card display Web page by clicking URL in the notice mail or entering URL in a Web browser. By connecting the card display Web page, the card created by the card sender can be displayed on the display 16 (FIG. 2) of the card receiver terminal 5.

FIG. 2 is a block diagram showing the hardware structure of the computer PC. The computer PC is used as the card transmitter server 2, advertiser terminal 3, card sender terminal 4 and card receiver terminal 5 of this embodiment.

The computer PC is constituted of a bus 7, a ROM 8, a RAM 9, a CPU 10, a timer 11, an external storage unit 12, a detector circuit 13, an operation unit 14, a display circuit 15, a display 16, a tone generator 17, a sound system 18, a communication interface 19, and a MIDI interface 20.

The bus 7 connects the ROM 8, the RAM 9, the CPU 10, the timer 11, the external storage unit 12, the detector circuit 13, the display circuit 15, the tone generator 17, the communication interface 19 and the MIDI interface 20.

A user can input various settings and necessary information by using the operation unit (input means) 14 connected to the detector circuit 13, in order to create a card, request for an advertisement, or display a card. The operation unit 14 may be any device capable of outputting signals corresponding to user inputs, such as a mouse, a keyboard for character inputs, a keyboard for musical performance, a joystick, and a switch. A plurality of operation units may be connected.

The display circuit 15 is connected to a display 16 and can display various informations on the display 16. A card created by the card sender can be displayed on the display 16 of the card sender terminal 4 or card receiver terminal 5.

The external storage unit 12 includes an interface for an external storage unit and is connected via the interface to the bus 7. The external storage unit 12 may be a floppy disk drive (FDD), a hard disk drive (HDD), a magneto optical disk (MO) drive, a compact disk read-only memory (CD-ROM) drive, a digital versatile disk (DVD) drive or the like.

The external storage unit 12 can store various data, programs for realizing the embodiment functions, and other data. The external storage unit 12 of the card transmitter server 2 stores a large capacity of music data, image data, advertisement data and the like necessary for creating a Web page for displaying a card. RAM 9 has working areas for CPU 10 for storing flags, registers, buffers and various data. ROM 8 can store various parameters, control programs, programs for realizing the embodiment functions, and other data. The programs and other data are not required to be stored duplicately in the external storage unit 12. CPU 10 performs calculations or controls in accordance with the control programs stored in ROM 8 or external storage unit 12.

The timer 11 is connected to CPU 10 and the bus 7 and supplies CPU 10 with a main clock signal, timing for interruption and the like.

The MIDI interface 20 is used for connection to an electronic musical instrument, other musical instruments, audio apparatuses, computers or the like, and can transmit/receive at least MIDI signals. The MIDI interface 20 is not limited only to a dedicated MIDI interface, but it may be other general interfaces such as RS-232C, universal serial bus (USB) and IEEE1394. In this case, data other than MIDI message data may be transmitted/received at the same time.

The electronic musical instrument 60 is an audio apparatus, musical instrument or the like connected to the MIDI interface 20. The type of an electronic musical instrument is not limited only to a keyed instrument, but other types may also be used such as a stringed instrument, a wind instrument and a percussion instrument. The electronic musical apparatus is not limited only to an electronic musical instrument of the type that the components thereof such as a tone signal generator and an automatic performance apparatus are all built in one integrated body, but these components may be discrete and interconnected by communication devices such as MIDI and various networks. The electronic musical instrument 60 can be used as an operation unit for inputting various settings and information.

The tone generator 17 generates tone signals in accordance with supplied MIDI signals or the like, and supplies the generated tone signals to a sound system 18. The sound system 18 includes a D/A converter and speakers, and converts supplied digital tone signals into analog tone signals to produce sounds.

The tone generator 17 may be of any type, such as a waveform memory type, an FM type, a physical model type, a harmonics synthesis type, a formant synthesis type, and an analog synthesizer type having a voltage controlled oscillator (VCO)+a voltage controlled filter (VCF)+a voltage controlled amplifier (VCA).

The tone generator 17 is not limited only to those made of hardware, but may be realized by a digital signal processor (DSP) and a microprogram, by a CPU and a software program, or by a sound card.

One tone generator may be used time sharing to form a plurality of sound producing channels, or a plurality of tone generators may be used to form a plurality of sound producing channels by using one tone generator per one sound producing channel.

The control programs, programs realizing functions according to the embodiment and the like may be stored in a hard disk of the external storage unit 12. By reading the control programs and the like from the hard disk to RAM 9, CPU 10 can perform operations similar to those when the control programs and the like are stored in ROM 8. In this case, addition, version-up and the like of the control programs and the like can be made easy.

The control programs, programs for realizing functions according to the embodiment and the like may be stored in a CD-ROM. The control programs, programs for realizing the embodiment functions and the like can be copied from CD-ROM to the hard disk. In this case, addition, version-up and the like of the control programs and the like can be made easy.

The communication interface 19 is connectable to a communication network 6 such as a local area network (LAN), the Internet, and a telephone line. The computer PC may be connected to a server via the communication network 6 to download the control programs, programs realizing the embodiment functions, cards and the like from the server into the external storage unit 12 such as HDD or RAM 9.

Figure 3:
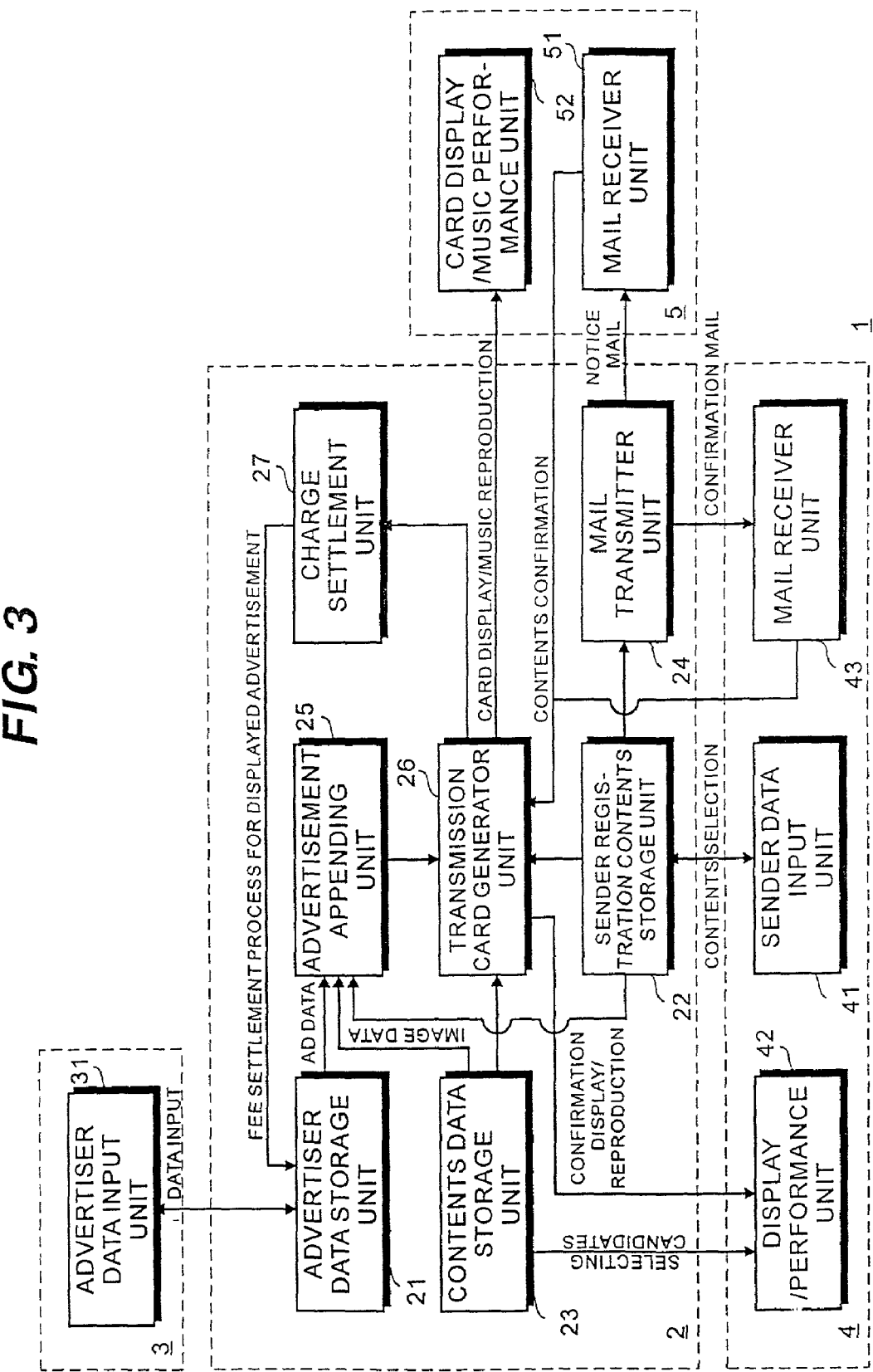
FIG. 3 is a block diagram showing the functions of the advertisement appending system 1 of the embodiment.

FIG. 3 is a functional block diagram of the advertisement appending system 1 of the embodiment. The advertisement appending system 1 is constituted of the card transmitter server 2, advertiser terminal 3, card sender terminal 4 and card receiver terminal 5. The card transmitter server 2 and the terminals 3 to 5 are interconnected by the communication network 6 (FIG. 1) such as the Internet and the communication interface 19 (FIG. 2) of each apparatus.

The advertiser terminal 3, card sender terminal 4 and card receiver terminal 5 are not required to be always or at the same time connected to the card transmitter server 2, but they may be connected or disconnected when necessary.

The card transmitter server 2 has an advertiser data storage unit 21, a sender registration contents storage unit 22, a contents data storage unit 23, a mail transmitter unit 24, an advertisement appending unit 25, a card generator unit 26 and a fee settlement unit 27.

Of these units, the functions of the advertiser data storage unit 21, sender registration contents storage unit 22 and contents data storage unit 23 are realized, for example, by the external storage unit 12 and CPU 10 shown in FIG. 2. The functions of the mail transmitter unit 24, advertisement appending unit 25, card generator unit 26 and fee settlement unit 27 are realized, for example, by CPU 10 shown in FIG. 2.

The contents data storage unit 23 stores beforehand a plurality of card display image data, a plurality of music data to be reproduced during displaying a card, and other data. Motion picture data or the like may also be stored. Music data may be MIDI data, WAVE data, or other music sound reproducing data. The contents data storage unit 23 is not necessarily required to be stored in the card transmitter server 23, but it may be in another computer PC, external connection type recording apparatus or storage medium connected via the network or the like.

The advertiser terminal 3 has an advertiser data input unit 31 whose function can be realized, for example, by the operation unit 14 shown in FIG. 2 or the like.

The card sender terminal 4 has a sender data input unit 41, a display/performance unit 42, and a mail receiver unit 43. The function of the sender data input unit 41 can be realized, for example, by the operation unit 14 shown in FIG. 2 or the like. The display function of the display/performance unit 42 can be realized, for example, by the display 16 shown in FIG. 2, and the tone generator 17 and sound system 18 thereof can realize the performance function, for example. CPU 10 shown in FIG. 2 can realize the function of the main receiver unit 43, for example.

The card receiver terminal 5 has a mail receiver unit 51, a card display/music performance unit 52. The function of the mail receiver unit 51 can be realized, for example, by CPU 10 shown in FIG. 2. The display function of the card display/music performance unit 52 can be realized, for example, by the display 16 shown in FIG. 2, and the music performance function thereof can be realized, for example, by the tone generator 17 and sound system 18.

Next, with reference to FIG. 3, the process will be described in which after the advertiser requests to append an advertisement and the card sender creates a card, the receiver browses the created card.

First, the advertiser accesses the card transmitter server 2 from the advertiser terminal 3, inputs advertiser data from the advertiser data input unit 31, and transmits the input advertiser data to the advertiser data storage unit 21 of the card transmitter server 2.

The input advertiser data includes an advertisement image to be appended to a card, a link to a Web page or the like to be displayed when the advertisement image is clicked, a card image or music data with which the advertisement image is displayed, and various contract terms.

The advertisement image to be appended to a card is, for example, a banner image containing the company name of the advertiser, a product name, a product image or the like. The advertiser creates in advance such a banner image and transmits it to the advertiser data storage unit 21. Templates of banner images may be created at the card transmitter server and stored in the advertiser data storage unit to automatically supply them to the advertiser. In this case, the advertiser inputs a character string or the like in the displayed banner image.

A link to a Web page or the like to be displayed when the advertisement image is clicked is a URL or the like of the Web page or the like managed by the advertiser. This link is not necessarily required and the advertiser may not input the link.

In selecting a card image or music data with which an advertisement image is displayed (in selecting an advertisement appending method), a card image or music data is selected independently or the type of a card image, the genre of music or the like may also be selected. If a specific keyword is contained in a message of the card, a specific card image or music data may be selected. The contents of the card image or music data may not be identified.

As the various contract terms, agreements of an advertisement fee and the like are input. In this embodiment, an advertisement fee is charged each time the advertisement is appended to a card. Therefore, an advertisement fee per one appended advertisement is determined as a base advertisement fee. The advertisement appending method may be changed with the advertisement fee, or the advertisement fee may be changed with the number of appended advertisements.

In this embodiment, since the advertisement fee is charged each time the advertisement is appended to a card, an upper limit of the total advertisement fee is required to be set. The upper limit of the advertisement fee may be set by a total money amount or by the number of appended advertisements.

When the total of the advertisement fee reaches the upper limit, the advertiser is deleted from the effective advertiser list. When the number of appended advertisements reaches a predetermined number, the base advertisement fee may be changed.

The advertiser then selects a charging method of the advertisement fee. As the charging method of the advertisement fee, account settlement at a financial institute, money transfer, a credit card or the like may be used.

The other advertiser data includes the name (trade name) of the advertiser, an address, a telephone number and the like.

When the above-described advertiser data is received, an advertiser account is formed and a database of the advertiser data is stored in the advertiser data storage unit 21 in correspondence with the advertiser account. This stored data is referred to or read out when a card is created later.

A request for an advertisement by the adviser is completed in the manner described above. These operations are repeated for different advertisers to store a plurality of advertisement data in the advertiser data storage unit 21.

Next, the card sender inputs card data from the sender data input unit 41 of the card sender terminal 4 to transmit it to the sender registration contents storage unit 22. In this embodiment, each time data is input, it is transmitted. However, after all data is input, it may be transmitted in block. Before block transmission, the card sender may check the contents of input data.

The card sender selects one of a plurality of images stored in the contents data storage unit 23 of the card transmitter server 2 so as to draw it on the card, and transmits the selected image. The card image data is transmitted from the contents data storage unit 23 to the display/performance unit 42 to be displayed as a card image data list. The card sender selects at least one card image data from the displayed list.

Next, the card sender inputs the email addresses and names of the card sender and receiver.

Thereafter, the card sender inputs a message to be appended to the card. This message is input by using the operation unit 14 (FIG. 2) such as a keyboard. The message is not necessarily required to be input. A plurality of fixed messages may be stored beforehand in the contents data storage unit 23 to allow the card sender to select a desired message from the fixed messages.

Next, the card sender selects one of a plurality of music stored in the contents data storage unit 23 so as to append it to the card. The music data is transmitted from the contents data storage unit 23 to the display/performance unit 42 to be displayed as a list of selectable music. The card sender selects at least one music to be reproduced when the card is displayed, from the music list. The music selected by clicking the music name in the list with the operation unit such as a mouse may be reproduced to allow the card sender to listen before it is transmitted.

After the above-described card data is input, the transmission card generator unit 26 creates the card and transmits it to the display/performance unit 42 to allow the card sender to confirm the created card. After the confirmation by the card sender, a card display file is generated and stored in the transmitter registration contents storage unit 22.

The card display file stores at least the locations of the image data and music data selected by the card sender and stored in the contents data storage unit 23, the location of corresponding advertisement data in the advertiser data storage unit 21, and the text data and the like input by the card sender.

The generated card display file is assigned a unique Internet address for accessing the file, and URL for accessing the Internet address is generated.

The card sender registration contents storage unit 22 stores the card display file, URL and personal information such as the email addresses and names of the card sender and receiver.

The generated URL together with the email addresses of the card sender and receiver is sent to the mail transmitter unit 24. The mail transmitter unit 24 transmits the email with embedded URL to the mail addresses of the card sender and receiver respectively as a confirmation mail and the notice mail.

As the mail receiver unit 43 of the card sender terminal 4 receives the confirmation mail, the card sender can check the created card by clicking URL embedded in the email or by entering URL into the Web browser.

As the mail receiver unit 51 of the card receiver terminal 5 receives the notice mail, the card receiver can transmit a request for the contents confirmation to the transmission card generator 26 by clicking URL embedded in the email or by entering URL into the Web browser.

Upon reception of the request for the contents confirmation, the transmission card generator unit 26 generates a Web page corresponding to the input URL. In generating the Web page, first the card sender registration contents corresponding to URL are read from the card sender registration contents storage unit 22, and by referring to the read contents, the image data and music data corresponding to the Web page are read from the contents data storage unit 23.

If there is an advertisement image corresponding to the image data or music data, the image data is read from the contents data storage unit 23 and sent to the advertisement appending unit 25 under the control of the transmission card generator unit 26. The corresponding advertisement image is read from the advertiser data storage unit 21 and sent to the advertisement appending unit 25.

The advertisement appending unit 25 appends the advertisement image to the read image data, and transmits the synthesized image to the transmission card generator unit.

By using the image data with the appended advertisement image and the music data, the transmission card generator unit 26 generates the Web page for displaying the card, and transmits it to the card display/music performance unit 52 of the card receiver terminal 5.

After the Web page for displaying the card is transmitted, the transmission card generator unit 26 instructs the fee settlement unit 27 to perform a fee settlement process for the advertiser registered the advertisement image appended by the advertisement appending unit 25.

The fee settlement unit 27 performs the instructed fee settlement process by referring to the advertiser database stored in the advertiser data storage unit.

Upon reception of the Web page for displaying the card, the card display/music performance unit 52 displays the card on the display 16 (FIG. 2), and reproduces the music data to play music.

Figure 4:
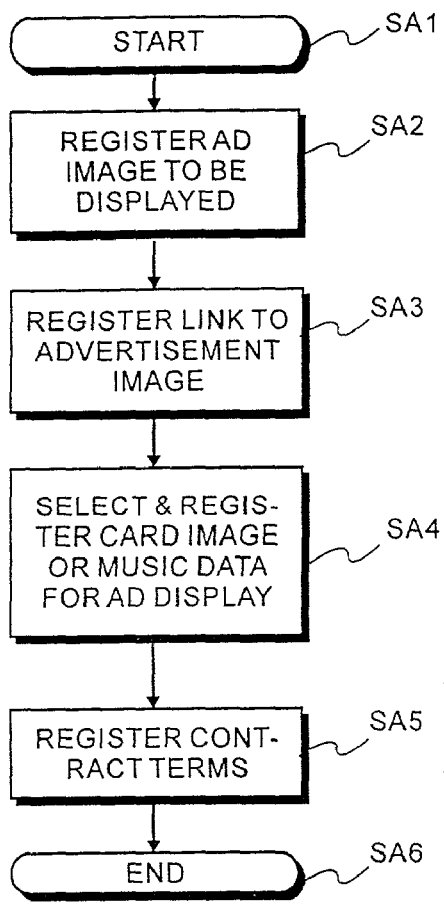
FIG. 4 is a flow chart illustrating an advertisement reception process to be executed by a card transmitter server 2 according to the embodiment of the invention.

FIG. 4 is a flow chart illustrating an advertisement reception process to be executed by CPU 10 (FIG. 2) of the card transmitter server 2 according to the embodiment of the invention.

At Step SA1 the advertisement reception process starts when the advertiser terminal 3 is connected to the card transmitter server 2. Thereafter, the flow advances to next Step SA2.

At Step SA2 the advertiser terminal 3 is prompted to register an advertisement image (advertisement banner) to be appended to a card. In registering advertisement image data, image data transmitted from the advertiser terminal 3 is stored in the advertiser data storage unit 21 (FIG. 3). After registration of the advertisement image data is completed, the flow advances to next Step SA3.

At Step SA3 the advertiser terminal 3 is prompted to designate a link to the Web page and the like to be displayed when the advertisement image is clicked with the operation unit such as a mouse. This link is not limited only to the Web page, but it may be advertisement image data, music data, motion picture data or the like. The link is not necessarily required to be registered. After registration of the link is completed, the flow advances to next Step SA4.

At Step SA4 the advertiser terminal 3 is prompted to select a card image or music data for which the advertisement is displayed, from the contents data storage unit 23 (FIG. 3). After the card image or music data for which the advertisement is displayed, is selected, the flow advances to next Step SA5.

A key word may be registered. The key word may be a "birthday", "Mother's Day" or the like. As will be later described, an advertisement may be appended to the card having a message containing such a key word.

With this key word, the advertiser can select freely the contents for which an advertisement is displayed. It is therefore possible to enhance the advertisement effects by selecting the contents expected to be used frequently. A plurality of advertisements may be assigned to specific contents.

At Step SA5 the advertiser terminal 3 is prompted to input various contract terms. As described earlier, charging information of the upper limit of an advertisement fee, a charging method, a name (trade name), an address and the like and information for identifying the advertiser are input. An agreement of an advertisement appending contract may be input. The category of an advertiser may be input. The category relates to the category of advertised goods such as "computer related products", "books", and "music". After the contract terms are input, the flow advances to next Step SA6.

At Step SA6, the advertisement reception process is terminated and the advertiser terminal 3 is disconnected.

Information input at Steps SA2 to SA5 is stored in the advertiser data storage unit 21 (external storage unit 12) shown in FIG. 3 or the like.

The advertiser can confirm the charging state, change the subject for which the advertisement is displayed, continue or discontinue the contract, at any time desired by connecting the card transmitter server 2.

Figure 5:
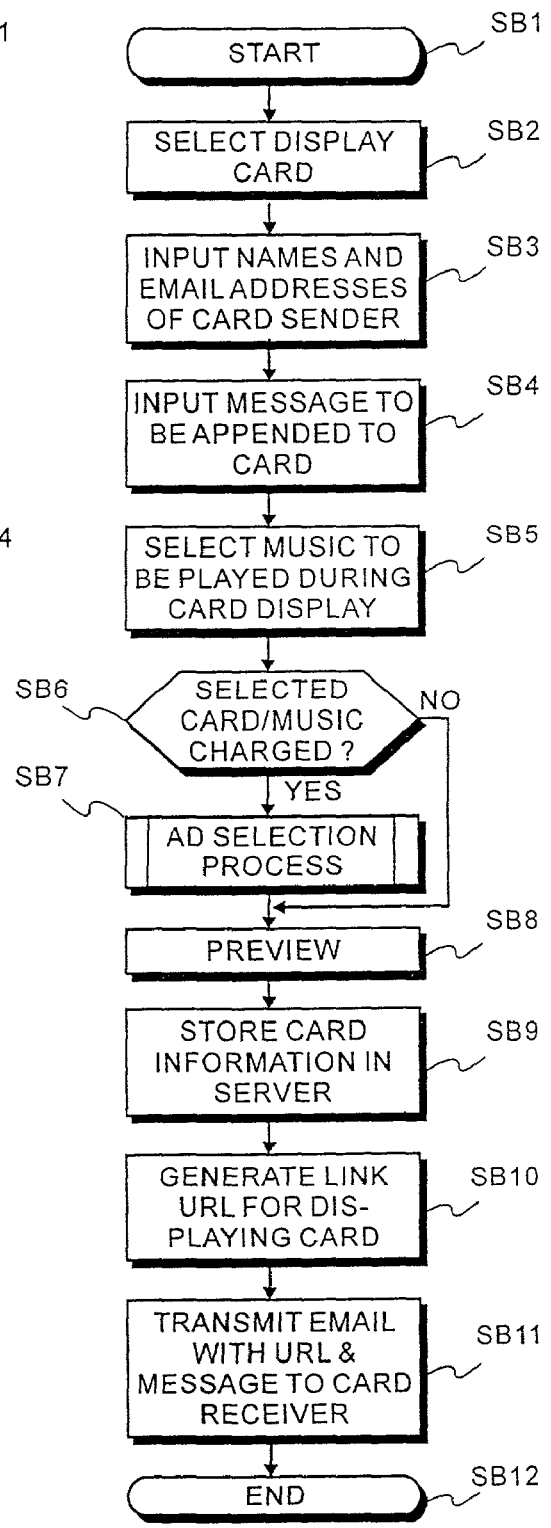
FIG. 5 is a flow chart illustrating a card mailing reception process to be executed by a card transmitter server 2 according to the embodiment of the invention.

FIG. 5 is a flow chart illustrating the card transmission reception process to be executed by CPU 10 (FIG. 2) of the card transmitter server 2 according to the embodiment of the invention.

At Step SB1, the card transmission reception process starts when the card sender terminal 4 is connected to the card transmitter server 2. Thereafter, the flow advances to next Step SB2.

At Step SB2 a list of selectable (stored) card display images is transmitted to the card sender terminal 4, and the card sender terminal 4 is prompted to select an image (display card) displayed on the card. After the display card is selected, the flow advances to next Step SB3.

At Step SB3, the card sender terminal 4 is prompted to input the email addresses and names of the card sender and receiver. After the email addresses and names of the card sender and receiver are input, the flow advances to next Step SB4.

At Step SB4, the card sender terminal 4 is prompted to input a message to be appended to a card. A plurality of proto-typed messages may be stored in advance in the contents data storage unit 23 (FIG. 3) to display the list of selectable proto-typed messages at the card sender terminal 4 and allow the card sender to select a desired one from the list. After it is confirmed that the message is input or that the card sender does not input a message, the flow advances to next Step SB5. In order to confirm that the message is input, a switch or the like for indicating a message input completion may be provided at the card sender terminal 4 and the card sender depresses the switch after the message is input. If a message is not appended, an input operation is not performed and an end switch is depressed.

At Step SB5, a list of music data capable of being appended to the card is transmitted to the card sender terminal 4, and the card sender 4 is prompted to select a desired music to be reproduced during the card display, from the list of music data including a plurality of music stored in the contents data storage unit 23. After music data is selected, the flow advances to next Step SB6.

At Step SB6 it is judged whether the selected display card or music data is fee-charged. If fee-charged, the flow advances to next Step SB7 indicated by a YES arrow. If not fee-charged (free), the flow skips to Step SB8 indicated by a NO arrow.

In judging whether the display card or music data is fee-charged, an identifier indicating fee-charged may be added to the fee-charged display card or music data to allow reference to the identifier, or a table indicating each fee-charged display card and music data may be prepared to allow reference to the table.

Figure 6:
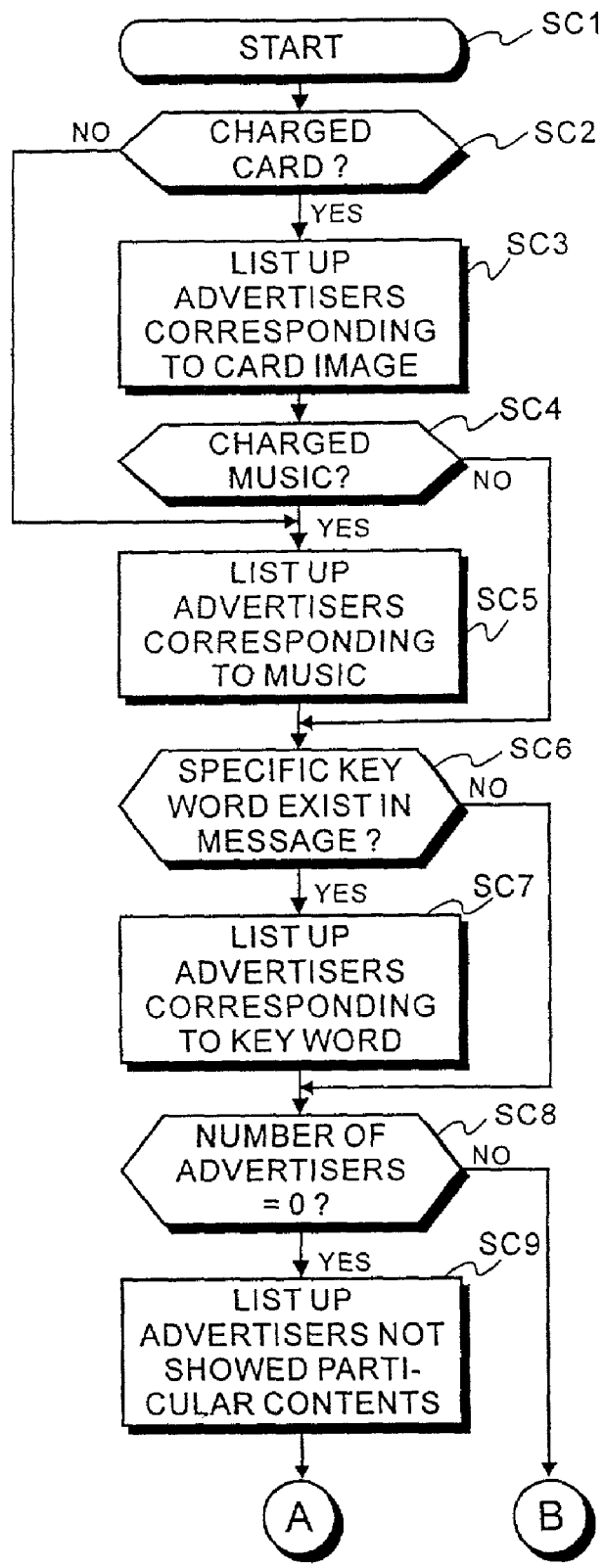
FIG. 6 is a flow chart illustrating the details of an advertisement selection process.

At Step SB7, an advertisement selection process to be later described with reference to FIG. 6 is executed. After the advertisement selection process is completed, the flow advances to next Step SB8.

At Step SB8 a card is created in accordance with card information input at Steps SB2 to SB5 (SB2 to SB7 if fee-charged), and displayed at the card sender terminal 4 as a preview. After the card sender checks the created card, the flow advances to next Step SB9.

At Step SB9 the card information is stored in the card sender registration contents storage unit 22 of the card transmitter server 2. Thereafter, the flow advances to next Step SB10.

At Step SB10 a URL of the Web page for displaying the card is generated. The generated URL together with the card information is stored in the card sender registration contents storage unit 22 of the card transmitter server 2. Thereafter, the flow advances to next Step SB11.

At Step SB11 the notice mail embedded with URL is transmitted to the email address of the card receiver input at Step SB3. At the same time the confirmation mail embedded with URL is transmitted to the email address of the card sender input at Step SB3. The notice mail may include the message input at Step SB4. An advertisement may be appended to the notice mail. Thereafter, the flow advances to next Step SB12.

At Step SB12 the card transmission reception process is terminated.

FIG. 6 is a flow chart illustrating the details of the advertisement selection process to be executed at Step SB7 shown in FIG. 5.

At Step SC1 the advertisement selection process starts. Thereafter, the flow advances to Step SC2.

At Step SC2 it is judged whether the card (display card) selected at Step SB2 shown in FIG. 5 is fee-charged. If the display card is fee-charged, the flow advances to next Step SC3 indicated by a YES arrow. If the display card is free of charge, the flow skips to Step SC5 indicated by a NO arrow.

This advertisement selection process starts only when at least one of the display card and music data is fee-charged. Therefore, if the display card is not fee-charged, it means that the music data is fee-charged.

At Step SC3 advertisers corresponding to the display card are listed up by referring to the advertiser data storage unit 21 (FIG. 3). The advertiser corresponding to the display card means the advertiser selected at Step SA4 shown in FIG. 4 the card image for which the advertisement is displayed. Thereafter, the flow advances to next Step SC4.

At Step SC4 it is judged whether the music data selected at Step SB5 shown in FIG. 5 is fee-charged. If the music data is fee-charged, the flow advances to next Step SC5 indicated by a YES arrow. If the music data is free, the flow skips to Step SC6 indicated by a NO arrow.

At Step SC5 advertisers corresponding to the music data are listed up by referring to the advertiser data storage unit 21 (FIG. 3). The advertiser corresponding to the music data means the advertiser selected at Step SA4 shown in FIG. 4 the music data for which the advertisement is displayed. Thereafter, the flow advances to next Step SC6.

At Step SC6 the message input from the card sender terminal 4 at Step SB4 shown in FIG. 5 is searched to judge whether the message contains a specific keyword. If a specific keyword is detected, the flow advances to next Step SC7 indicated by a YES arrow. If there is no specific keyword, the flow skips to Step SC8 indicated by a NO arrow.

For example, it is checked whether the message contains a keyword such as "birthday" and "Mother's Day".

Specific keywords input by advertisers may be stored in a table, or a key word table is prepared in advance.

By sampling advertisers by using the keyword, an advertisement suitable for the card can be appended and the more efficient advertisement effects can be expected.

At Step SC7 advertisers corresponding to the keyword detected at Step SC6 are listed up by referring to the advertiser data storage unit 21 (FIG. 3). Thereafter, the flow advances to Step SC8.

At Step SC8 it is judged whether the number of advertisers listed up at Steps SC3, SC5 and SC7 is 0. If 0, the flow advances to next Step SC9 indicated by a YES arrow. If not 0, the flow skips to Step SC12 indicated by a NO arrow.

At Step SC9, advertisers not registered particular contents are listed up by referring to the advertiser data storage unit 21 (FIG. 3). Thereafter, the flow advances to next Step SC10.

Figure 7:
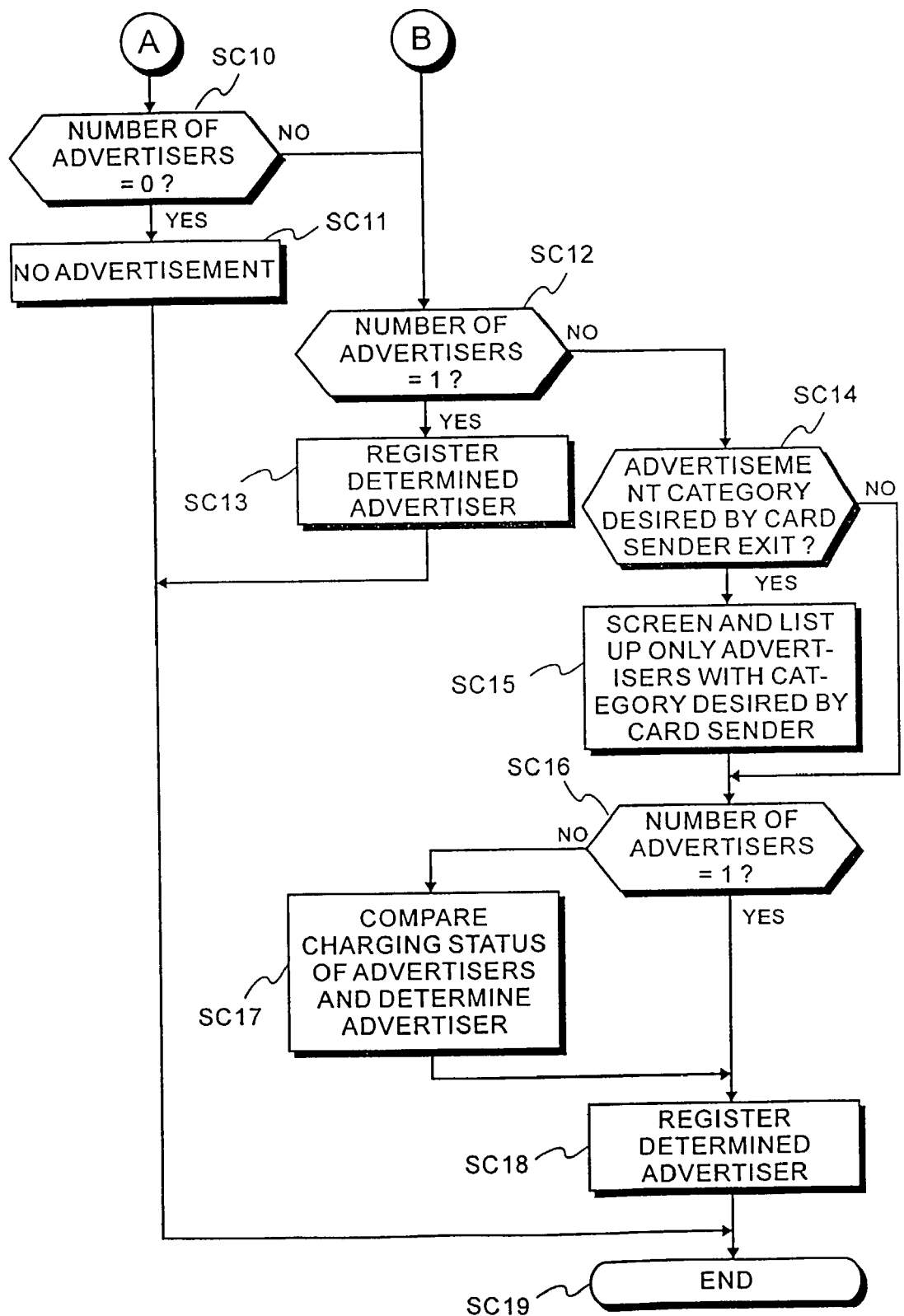
FIG. 7 is a flow chart illustrating the details of the advertisement selection process.

FIG. 7 is a flow chart illustrating the advertisement selection process after the process of the flow chart shown in FIG. 6.

At Step SC10 it is judged whether the number of advertisers listed up at Step SC9 is 0. If 0, the flow advances to next Step SC11 indicated by a YES arrow. If not 0, the flow branches to Step SC12 indicated by a NO arrow.

At Step SC11 it is judged that there is no advertiser so that information of not appending advertisement is registered in the card sender registration contents storage unit 22 together with the card information. Thereafter, the flow advances to Step SC19 to terminate the advertisement selection process.

If there is no advertiser, the card may be transmitted without appending an advertisement. Alternatively, the card sender is prompted to change the display card, music data or the like. A default advertisement image may be prepared and appended to the card to transmit it.

At Step SC12 it is judged whether the number of advertisers listed up at Steps SC3, SC5 and SC7 or SC9 is 1. If 1, the flow advances to next Step SC13 indicated by a YES arrow. If not 1 (2 or more), the flow branches to Step SC14 indicated by a NO arrow.

At Step SC13 an advertisement of the listed-up single advertiser to be appended to the card is used, and this information is registered in correspondence with the Web page for displaying the card. Thereafter, the flow advances to Step SC19 to terminate the advertisement selection process.

At Step SC14 the card sender is prompted to input or select a desired advertisement category. If the card sender has a desired advertisement category, the flow advances to next Step SC15 indicated by a YES arrow. If the card sender does not have a desired advertisement category, the flow skips to Step SC16.

By prompting the card sender to input or select a desired advertisement category, an advertisement suitable for the card image selected by the card sender can be selected and appended.

At Step SC15 only advertisers coincident with the category selected or input by the card sender at Step SC14 are screened and listed up. Thereafter, the flow advances to next Step SC16.

Advertisers to be screened are not required to be perfectly coincident with the category, but advertisers near to the category may be screened.

At Step SC16 it is judged whether the number of advertisers listed up at Steps SC3, SC5 and SC7 or SC9, SC9 or SC6 is 1. If 1, the flow advances to next Step SC18 indicated by a YES arrow. If not 1 (2 or more), the flow branches to Step SC17 indicated by a NO arrow.

At Step SC17 the charging states of the advertisers are compared and one advertiser is selected from the listed-up advertisers. Thereafter, the flow advances to Step SC18.

In the charging state comparison, for example, the advertiser having the smaller number of display times is charged a smaller fee, and the advertisement of the advertiser charged the smaller fee is displayed with a priority over other advertisers.

In this manner, advertisements of all registered advertisers can be appended impartially to cards.

Alternatively, an advertisement of the advertiser having a higher rank of contract terms may be displayed with a priority over other advertisers.

At SC18 an advertisement to be appended is determined as the advertisement of the selected advertiser, and this information is registered in correspondence with the Web page for displaying the card. Thereafter, the flow advances to next Step SC19.

At Step SC19 the advertisement selection process is terminated.

In this embodiment, although the card sender cannot select an advertiser, the card sender may select an advertiser registered an advertisement image to be appended to a card, at Step SC14 or SC17.

In this manner, the card sender can create a card matching the image of the card sender. In this case, after the card sender selects an advertiser and decides to append the advertisement of the advertiser to the card, this information is registered in correspondence with the Web page for displaying the card. Thereafter, the flow advances to Step SC19 whereat the advertisement selection process is terminated.

Figure 8:
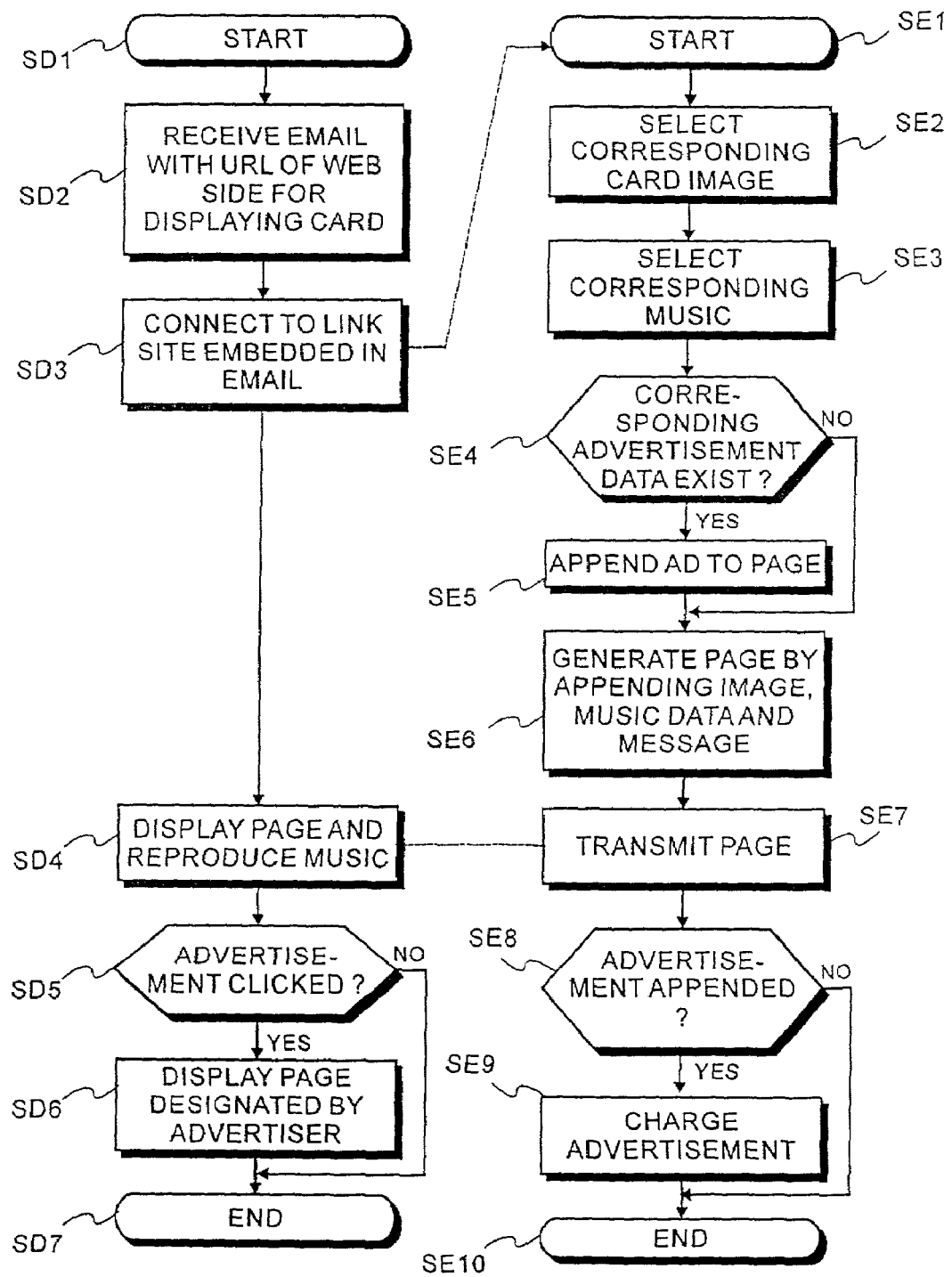
FIG. 8 is a flow chart illustrating a card reception display process.

FIG. 8 is a flow chart illustrating the card reception display process to be executed by CPU 10 (FIG. 2) of the card transmitter server 2 and card receiver terminal 5 according to the embodiment of the invention. The left side of this flow chart shows a process to be executed by the card receiver terminal 5, and the right side shows a process to be executed by the card transmitter server 2. A broken line arrow shown in FIG. 8 indicates a data flow transmitted and received via the communication network 6.

At Step SD1 the card receiver side process starts. Then, the flow advances to next Step SD2.

At Step SD2 the notice email with URL indicating the link to the Web page for displaying the card is received. After the notice email is received, the flow advances to next Step SD3.

At Step SD3 the card receiver terminal is connected to the link site embedded in the notice email received at Step SD2. Connection to the link site is established by clicking URL with the operation unit such as a mouse or by inputting URL in the address field of the Internet browser. After connection to the link site, the flow advances to next Step SD4.

By connecting to the link site, the process on the card transmitter server 2 side starts (Step SE1) as will be described later. Thereafter, the process on the card transmitter 2 side proceeds to Step SE7 whereat the card display page is transmitted from the card transmitter server 2 as will be later described.

At Step SD4 upon reception of the card display page transmitted from the card transmitter server 2, the card is displayed, for example, on the display 16 shown in FIG. 2 and music is reproduced by the tone signal generator 17 to produce sounds from the sound system 18. Thereafter, the flow advances to next Step SD5.

At Step SD5 it is judged whether the card receiver clicks the advertisement. If clicked, the flow advances to next Step SD6 indicated by a YES arrow. If the advertisement is not clicked and the card display is stopped, the flow skips to Step SD7.

At Step SD6 the card receiver terminal is connected to the link site of the advertisement image registered by the advertiser at Step SA3 shown in FIG. 4. After the connection to the link site, the process is performed in accordance with the information supplied by the link site. After the link site is disconnected, the flow advances to next Step SD7.

At Step SD7, the card receiver side process is terminated.

The process on the card transmitter server 2 side shown in the left side of FIG. 8 will be described.

At Step SE1 the card receiver terminal 5 is connected to the card transmitter server 2 (Step SD3) to start the card transmission process. Thereafter, the flow advances to next Step SE2.

At Step SE2 the display card corresponding to the connected Web page is read from the contents data storage unit 23 (external storage unit 12). Thereafter, the flow advances to next Step SE3.

At Step SE3 the music data corresponding to the connected Web page is read from the contents data storage unit 23 (external storage unit 12). Thereafter, the flow advances to next Step SE4.

At Step SE4 the card sender registration contents storage unit 23 (external storage unit 12) is searched to judge whether there is an advertiser corresponding to the connected Web page. If there is a corresponding advertiser, the flow advances to next Step SE5. If there is no corresponding advertiser, the flow skips to Step SE6.

At Step SE5 the advertisement image registered by the corresponding advertiser is added to the Web page. Thereafter, the flow advances to next Step SE6.

At Step SE6 data selected at Steps SE2 and SE3 are added to the Web page, and a Web page for displaying the card is created, for example, as HTML format data. Thereafter, the flow advances to next Step SE7.

At Step SE7 the Web page for displaying the card created at Step SE6 is transmitted to the card receiver terminal 6 connected at Step SE1. After this transmission, the flow advances to next Step SE8.

At Step SE8 it is judged whether the transmitted Web page advertisement is appended. If appended, the flow advances to next Step SE9 indicated by a YES arrow. If not appended, the flow skips to Step SE10 indicated by a NO arrow.

At Step SE9 an advertisement fee is charged to the advertiser registered the advertisement image appended to the Web page. Thereafter, the flow advances to next Step SE10.

At Step SE10 the card transmission process is terminated.

According to the embodiment, music or an image required to pay a copyright royalty or the like can be supplied to the card sender free of charge if there is an advertiser.

Since the fee is charged each time the advertisement is appended, the fee is charged only when the consumer looks at the advertisement. Wasteful advertisement fees can be reduced.

According to the embodiment, an advertisement suitable for the card can be automatically selected and appended to the card.

When an advertisement is selected, personal information (e.g., age, gender, hobby or the like) of the card sender and receiver, a card sending date and time or the like may be referred to.

If the advertiser wishes and the card sender acknowledges, user information such as card sender and receiver may be supplied to the advertiser.

Selecting an advertiser is not limited only to the embodiment. For example, an advertiser may be selected randomly or sequentially in order, or an advertiser paying a higher advertisement fee is selected with a priority over other advertisers.

In this embodiment, although fee-charged image data or music data is appended with an advertisement, the advertisement may not be appended. An advertisement may be appended to free image data or music data.

In this embodiment, after the card sender inputs card data and confirms the contents of the card, the card file is formed and stored in the card sender registration contents storage unit 22. Instead, the card data input by the card sender may be stored in the card sender registration contents storage unit 22, and when the card receiver displays the card, the card may be generated automatically by supplying the input data or an identifier of the input data to the card transmitter server.

In this case, the data input by the card sender or the identifier of the input data is embedded in URL described in the email sent to the card receiver. When the card receiver clicks URL or enters it in the Web browser, the data is passed to the server and in accordance with the data, the card is automatically generated.

The embodiment may be realized by a computer installed with the computer program and the like realizing the functions of the embodiment.

In such a case, the computer program and the like realizing the embodiment functions may be stored in a computer readable storage medium such as a CD-ROM and a floppy disk and supplied to users.

If a general-purpose computer or personal computer is connected to a communication network such as a LAN, the Internet and a telephone line, the computer program and various data may be supplied to the general-purpose computer or personal computer via the communication network.

The present invention has been described in connection with the preferred embodiments. The invention is not limited only to the above embodiments. It is apparent that various modifications, improvements, combinations, and the like can be made by those skilled in the art.

What are claimed are:

1. An apparatus for appending an advertisement to a music card, comprising:
   a storage device that stores a plurality of image data, a plurality of music data, and a plurality of advertisement data, respectively for creating the music card;
   a receiver that receives a request from a card sender via a network;
   a card creating device that creates, in accordance with the request, the music card by selecting an image data and a music data from the plurality of image data and the plurality of music data stored in said storage device, said card creating device having interface accessible by an advertiser and operable to allow the advertiser to designate music data, image data, or both with which advertisement data is selectively added;
   an advertisement appending device that appends at least one advertisement data among the plurality of advertisement data stored in said storage device to the music card, if either the selected image data or music data is fee-charged; and
   a transmitter that transmits the music card free of charge by appending appended the advertisement data to a card and transmitting said card to a card receiver via the network,
   the advertisement appending device being operative to selectively:
   (a) list up advertisers corresponding to image data or music data;
   (b) list up advertisers corresponding to keyword data;
   (c) list up advertisers that have not registered particular contents;
   (d) attach a default advertisement image when there is no advertiser associated with the card;
   (e) select an advertisement image based on selection by card sender.

2. An apparatus for appending an advertisement to a music card according to claim 1, wherein said receiver receives an advertisement data transmitted from an advertiser, and the advertisement data stored in said storage device are advertisement data either transmitted from said advertiser or supplied as default advertising data in the event the advertiser has not designated advertising data,
   further comprising an advertiser charging device that charges an advertisement fee to said advertiser if said advertisement appending device appends said advertisement data transmitted from said advertiser.

3. An apparatus for appending an advertisement to a music card according to claim 1, wherein the music data is a MIDI data.

4. An apparatus for appending an advertisement to a music card according to claim 1, wherein the network is the Internet.

5. An apparatus for appending an advertisement to a music card according to claim 1, further comprising a notice mail transmitter that transmits a notice mail to the card receiver, the notice mail notifying that the music card was created and saying a method of displaying the music card.

6. An apparatus for appending an advertisement to a music card according to claim 5, wherein the notice mail is an Internet mail and the method of displaying the music card includes a URL of the Internet.

7. The apparatus of claim 1 wherein the advertisement appending device is operative to execute selected ones the recited operations (a) through (e) in the order described, such the features recited in (a) and (b) take precedence over the features recited in (c) and (d) and the features recited in (c) and (d) take precedence over the features recited in (e).

8. An apparatus for appending an advertisement to a music card, comprising:
   storage means for storing a plurality of image data, a plurality of music data, and a plurality of advertisement data, respectively for creating the music card;
   receiving means for receiving a request from a card sender via a network;
   card creating means for creating, in accordance with the request, the music card by selecting an image data and a music data from the plurality of image data and the plurality of music data stored in said storage means, said card creating means having interface accessible by an advertiser and operable to allow the advertiser to designate music data, image data, or both with which advertisement data is selectively added;
   advertisement appending means for appending at least one advertisement data among the plurality of advertisement data stored in said storage means to the music card, if either the selected image data or music data is fee-charged; and
   transmitting means for transmitting the music card free of charge by appending the advertisement data to a card and transmitting said card to a card receiver via the network,
   the advertisement appending means being operative to selectively:
   (a) list up advertisers corresponding to image data or music data;
   (b) list up advertisers corresponding to keyword data;
   (c) list up advertisers that have not registered particular contents;
   (d) attach a default advertisement image when there is no advertiser associated with the card;
   (e) select an advertisement image based on selection by card sender.

9. The apparatus of claim 8 wherein the advertisement appending means is operative to execute selected ones of the recited operations (a) through (e) in the order described, such the features recited in (a) and (b) take precedence over the features recited in (c) and (d) and the features recited in (c) and (d) take precedence over the features recited in (e).

10. A method for appending an advertisement to a music card by a network server having storage means for storing a plurality of image data, a plurality of music data, and a plurality of advertisement data, respectively for creating the music card, the method comprising the steps of;
   (a) receiving a request from a card sender via a network;
   (b) creating, in accordance with the request, the music card by selecting an image data and a music data from the plurality of image data and the plurality of music data stored in said storage means, at least one of the plurality of music data and the plurality of image data being designated by an advertiser;
   (c) appending at least one advertisement data among the plurality of advertisement data stored in said storage means to the music card, if either the selected image data or music data is fee-charged; and
   (d) transmitting the music card free of charge by appending the advertisement data to a card and transmitting said card to a card receiver via the network
   wherein said appending step includes selectively:
   (a) listing up advertisers corresponding to image data or music data;
   (b) listing up advertisers corresponding to keyword data;

(c) listing up advertisers that have not registered particular contents;

(d) attaching a default advertisement image when there is no advertiser associated with the card;

(e) selecting an advertisement image based on selection by card sender.

11. The apparatus of claim 10 wherein the advertisement appending step performs selected ones of the recited operations (a) through (e) in the order described, such that the steps recited in (a) and (b) take precedence over the steps recited in (c) and (d) and the steps recited in (c) and (d) take precedence over the steps recited in (e).

12. A storage medium storing a program, which a computer executes to realize a process for appending an advertisement to a music card by a network server having storage means for storing a plurality of image data, a plurality of music data, and a plurality of advertisement data, respectively for creating the music card, the process comprising the instructions of;

(a) receiving a request from a card sender via a network;

(b) creating, in accordance with the request, the music card by selecting an image data and a music data from the plurality of image data and the plurality of music data stored in said storage means at least one of the plurality of music data and the plurality of image data being designated by an advertiser;

(c) appending at least one advertisement data among the plurality of advertisement data stored in said storage means to the music card, if either the selected image data or music data is fee-charged; and (d) transmitting the music card free of charge by appending the advertisement data to a card and transmitting said card to a card receiver via the network, wherein said appending step includes selectively:

(a) listing up advertisers corresponding to image data or music data;

(b) listing up advertisers corresponding to keyword data;

(c) listing up advertisers that have not registered particular contents;

(d) attaching a default advertisement image when there is no advertiser associated with the card;

(e) selecting an advertisement image based on selection by card sender.

13. The apparatus of claim 12 wherein the advertisement appending step performs selected ones of the recited operations (a) through (e) in the order described, such that the steps recited in (a) and (b) take precedence over the steps recited in (c) and (d) and the steps recited in (c) and (d) take precedence over the steps recited in (e).

* * * * *